Aug. 25, 1936.   E. E. WEMP   2,051,975
FREEWHEELING COUPLING AND CONTROL THEREFOR
Filed Jan. 8, 1934   3 Sheets-Sheet 1
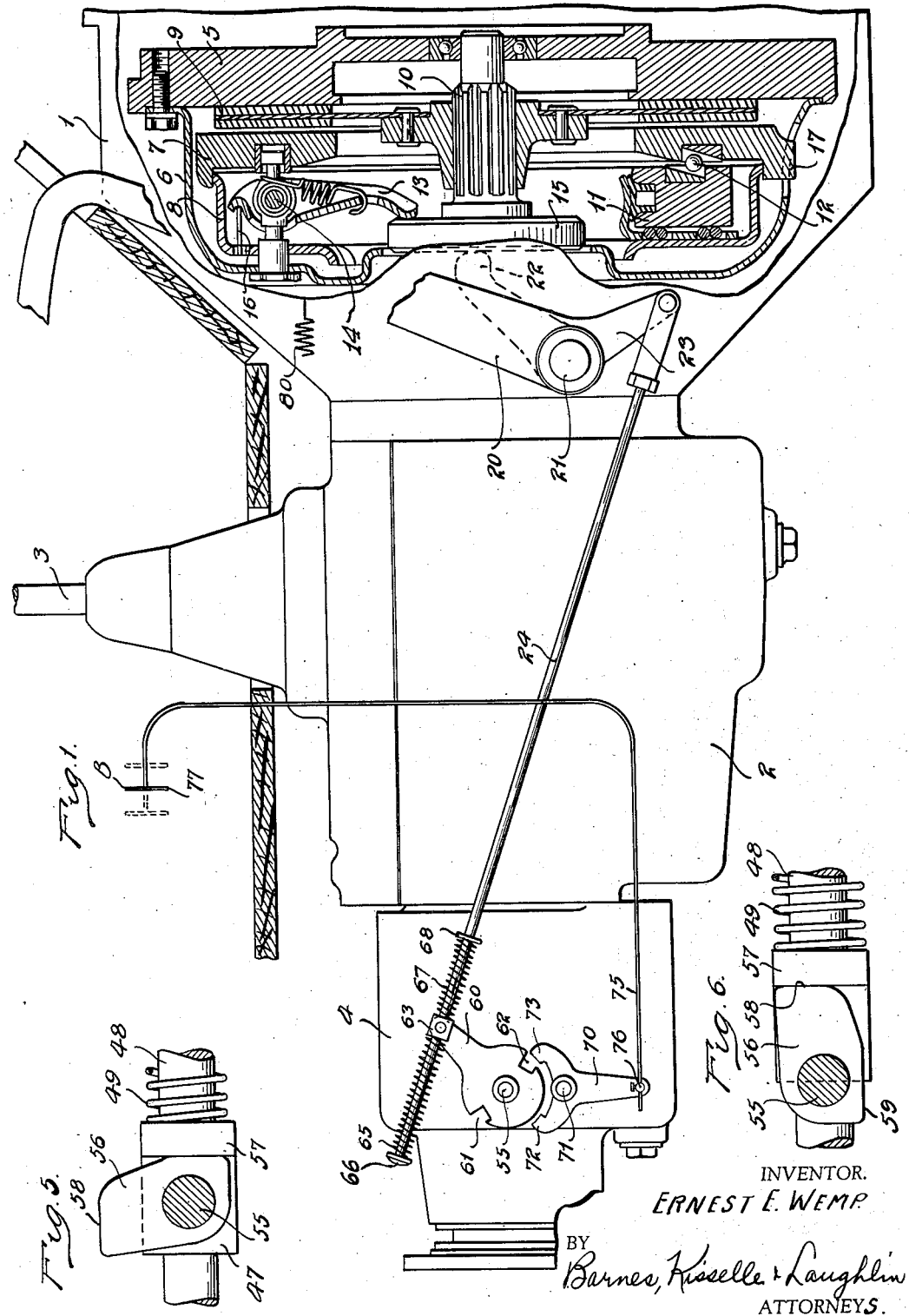
INVENTOR.
ERNEST E. WEMP
BY
Barnes, Kisselle & Laughlin
ATTORNEYS.

Aug. 25, 1936.  E. E. WEMP  2,051,975
FREEWHEELING COUPLING AND CONTROL THEREFOR
Filed Jan. 8, 1934  3 Sheets-Sheet 2
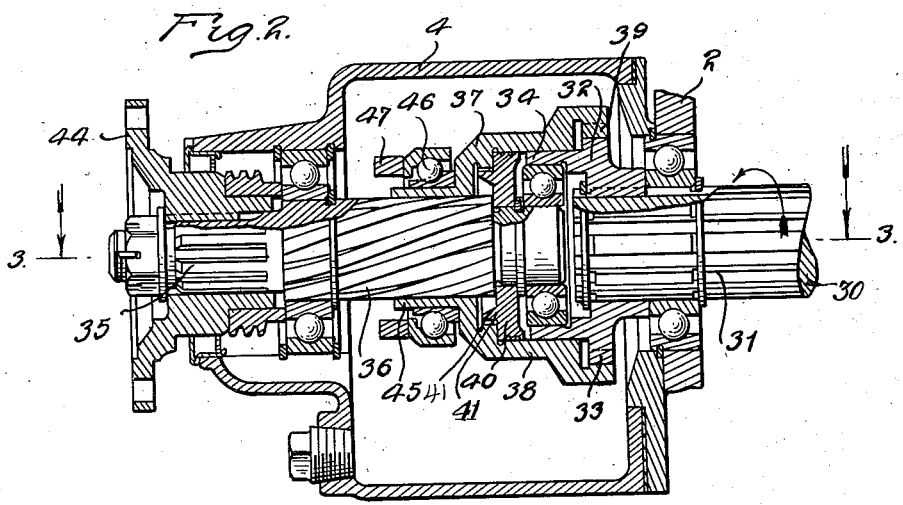
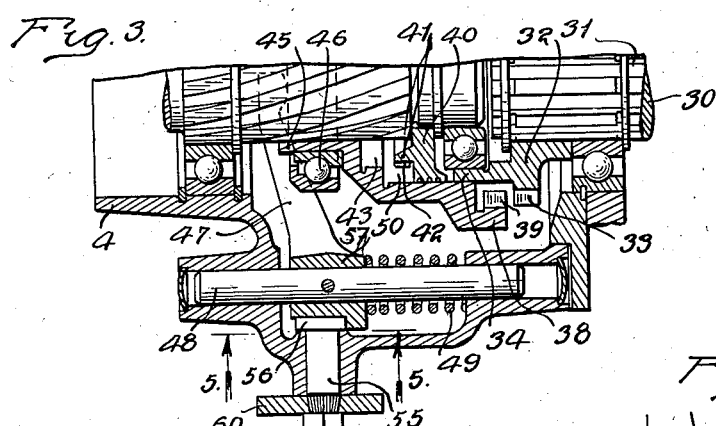
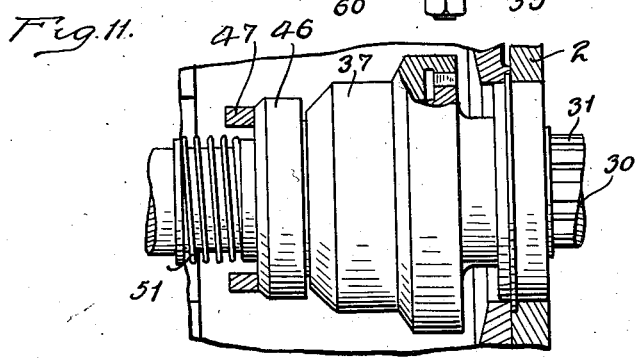
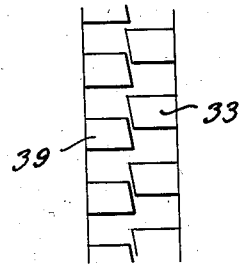
INVENTOR.
ERNEST E. WEMP.
BY
Barnes, Kisselle & Laughlin
ATTORNEYS.

Aug. 25, 1936.　　　　E. E. WEMP　　　2,051,975
FREEWHEELING COUPLING AND CONTROL THEREFOR
Filed Jan. 8, 1934　　　3 Sheets-Sheet 3
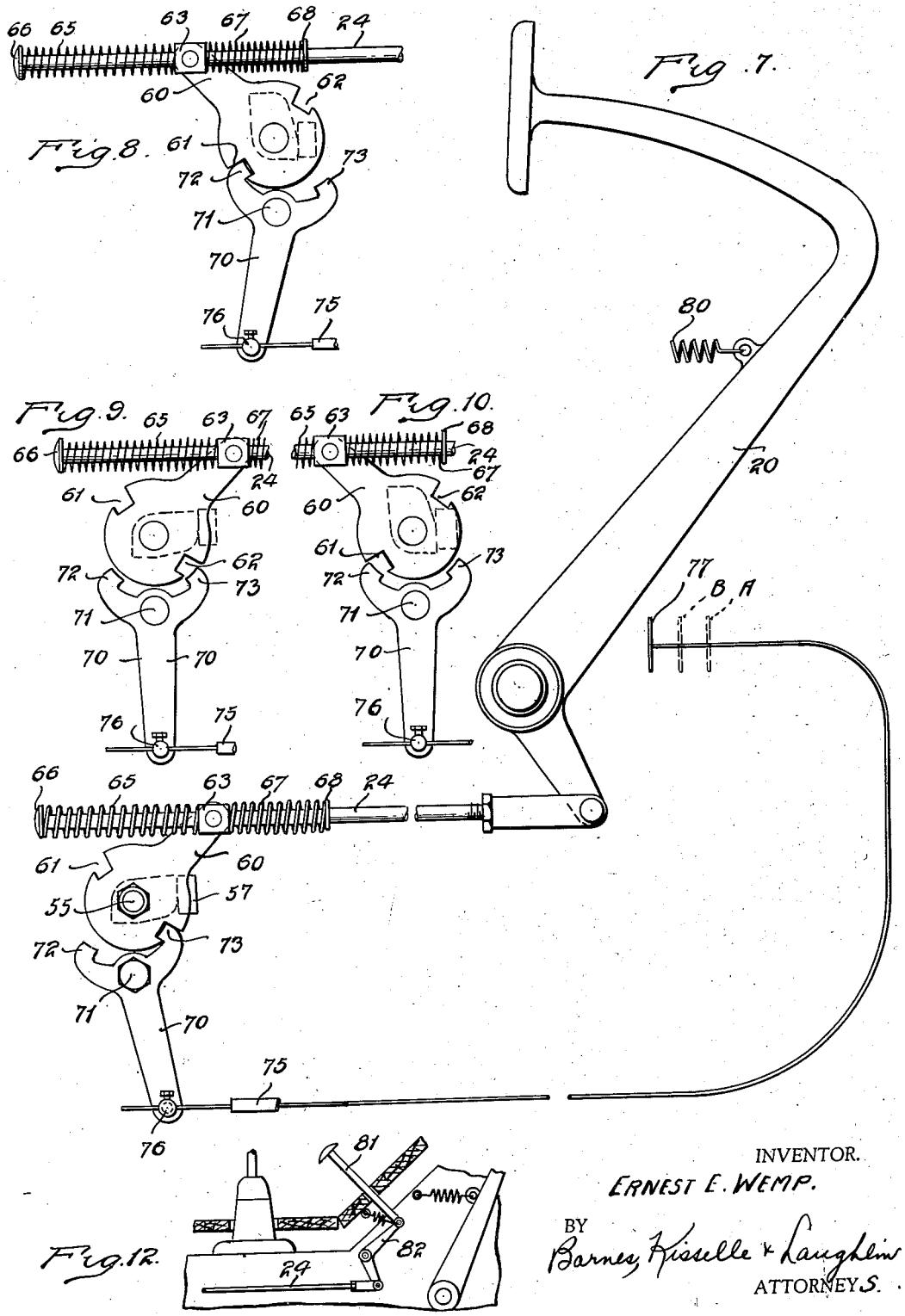
INVENTOR.
ERNEST E. WEMP.
BY
Barnes, Kisselle & Laughlin
ATTORNEYS.

Patented Aug. 25, 1936

2,051,975

UNITED STATES PATENT OFFICE 2,051,975

FREEWHEELING COUPLING AND CONTROL THEREFOR

Ernest E. Wemp, Detroit, Mich.

Application January 8, 1934, Serial No. 705,740

9 Claims. (Cl. 192—48)

This invention relates to a device or coupling for transmitting rotary motion from one member to another and which may permit the second member to overrun the first. When such a device is used in an automotive vehicle, the action obtained is generally known as free wheeling. The invention also relates to controlling means for the device, and to an arrangement particularly adapted for use in automotive vehicles.

The device for transmitting rotary motion from one member to another is one which provides for a positive coupling between the members, yet which will permit of an overrunning action when desired, as distinguished from such commonly known overrunning devices which embody, for example, gripping rollers and inclined planes acting thereon, or which embody a coil spring clutch. The control means embodies elements which may be directly associated with the clutch of an automotive vehicle so as to facilitate shifting the gears of a speed change transmission. It may here be stated that the device may be advantageously used with a centrifugal clutch which engages and remains engaged normally as a vehicle moves, say, from a standing start to a normal road speed. It will be understood that a break in the power transmitting line from the engine of the vehicle to the propelling wheels is necessary to shift gears, and when the present device is used its free wheeling action permits gear shifting without disengagement of the clutch. This, of course, can be accomplished with any properly located free wheeling unit, but many drivers do not wish to operate a vehicle with the free wheeling action. The invention herein provides for such a break in the power transmission line to permit gear shifting while at the same time it affords a positive normal driving connection so that there is no free wheeling action.

In the accompanying drawings:

Fig. 1 is a view illustrating a transmission housing and clutch housing cut away to show the clutch and some of the control means for the coupling.

Fig. 2 is a vertical sectional view taken through the coupling unit showing the same in positive driving position.

Fig. 3 is a partial sectional view taken substantially on line 3—3 of Fig. 2, showing the coupling unit in open or free wheeling position.

Fig. 4 is a diagrammatic view illustrating the preferred form of interengaging teeth in the coupling unit.

Fig. 5 is a detail view showing a cam element used in the control of the free wheeling action.

Fig. 6 is a view similar to Fig. 5 showing the cam element in another position.

Fig. 7 is a view illustrating a control lever and associated control parts for the coupling.

Fig. 8 is a diagrammatic view showing one position of some of the control parts.

Figs. 9 and 10 are views showing the unlocked position of the control elements, the two figures illustrating extreme movements of one of the control elements.

Fig. 11 is a view showing a modified arrangement.

Fig. 12 is a view illustrating a modified arrangement of the control.

The invention herein is shown as associated with an automotive vehicle structure, and a clutch housing is shown at 1, transmission housing at 2, which may have speed change gear therein changeable by a lever 3, and a housing 4 for the coupling unit. The particular clutch shown is a centrifugal clutch of the type disclosed in application Serial No. 672,794, filed May 25, 1933. The elements comprising the clutch are a flywheel of an engine 5, cover plate 6, pressure ring 7, and a back plate 8. A driven disc 9 is mounted on a driven shaft 10. Centrifugal weights 11 are arranged to shift radially outwardly and through the means of a ball 12 pocketed in recesses with inclined walls, as shown, urges the pressure ring to the right as Fig. 1 is viewed, so that the driven disc is frictionally engaged on opposite sides by the flywheel and the pressure ring, the reaction being taken by the back plate 8 through springs (not shown) between the back plate and the cover plate. A number of levers 13 pivotally mounted as at 14 may be shifted by a clutch throwout bearing 15. When the bearing 15 is shifted to the right the back plate 8 and pressure ring 7, together with the centrifugal weights, are shifted to the left to release the driven disc. The levers transmit their thrust to the back plate by insert pieces 16, and the back plate and pressure ring are connected by means (not shown), and the pressure ring may be driven by an interconnection with the cover plate, as shown at 17.

This briefly describes the clutch and so far as the present invention is concerned the details thereof need not be gone further into. Suffice it to say that at or about idling speed the weights shift radially inward to the position shown, thus releasing the clutch, and upon increase in the R. P. M. of the engine, the weights 11 shift radially outward and engage the clutch in a manner previously described.

The present invention may be used with any form of clutch, and for that matter may be used with the conventional manually-operated clutch. The word "manually" is used in a broad sense, as it is appreciated that clutches are released by the foot of the operator instead of the hand.

A clutch throw-out lever is shown at 20, pivoted as at 21, and when depressed shifts the bearing to the right through the means of a fork 22. The lever has an arm 23 to which may be connected a rod 24, the movements of which actuate certain controlling elements of the coupling unit.

Referring now to Fig. 2, the mechanism of the coupling is shown mounted in the housing 4. Extending into the housing 4 is a shaft 30, which is mounted in the transmission housing 2, and which herein will be termed the driving shaft. The end of the shaft may be splined as at 31 and mounted on the spline formation is the driving member 32. It has a radially extending portion provided with teeth as shown at 33 and an axially extending portion 34. This member is preferably held against axial movement. A driven shaft is shown at 35, the inner end of which may be piloted by a suitable bearing within the portion 34, and which is provided with a helical spline formation 36. Mounted upon the helical spline formation is a driven member 37. This member has a recessed axially extending part 38 for fitting over the portion 34, and its extreme end portion is provided with teeth 39. Preferably teeth with inclined ends are used, as shown in Fig. 4, such being a well known type of tooth for dental engagement, and the advantage of using such in the present invention will later be observed.

Mounted in a fixed position on the shaft 35, that is fixed from axial movement, is a stop 40. This stop has a circumferential rib 41 provided with grooves 42 in its external face and it is arranged to slidably fit into a recess formation 43 in the member 37. A suitable fitting 44 may be attached to the end of the shaft 35 which in turn may be coupled with the driving shaft extending to the rear axle of the vehicle.

The member 37 may have an axial extension 45 over which may be fitted a thrust bearing 46 arranged to be acted upon by a yoke 47. This yoke, as shown in Fig. 3, is mounted on a reciprocable rod 48 mounted in an extending part of the housing 4 and acted upon by a coil spring 49.

Before proceeding further with a description of the other mechanism it is believed that an explanation as to the operation of the free wheeling unit had best be made. The unit is designed to run in a lubricant such as oil or grease and the portion 38 of the driven member has an accurate fit over the portion 34 of the driving member. Now assume that the parts are in the Fig. 3 position, with the yoke held to the left by the spring. Now assume that the driving shaft increases in speed until it rotates faster than the driven shaft. The part 34 tends to carry the driven member 37 with it due to the drag action of the oil or lubricant and the close fit between the parts 38 and 34; accordingly the member 37 rotates relative to the shaft 35 and as it so rotates it shifts axially on the helical splines. The direction of rotation is clockwise as Figs. 2 and 3 are viewed from the right. Ultimately the teeth 39 move into engagement with the teeth 33. It will be appreciated that the member 32 may be rotating faster than the member 37, which corresponds to an up direction of the teeth 33 relative to the teeth 39 as Fig. 4 is viewed. It will be noted how the shape of the teeth facilitates dental engagement. As soon as there is a dental engagement there is a positive tendency to further shift the member 37 on the helical splines, and this continues until the member 37 abuts and is stopped by the collar 40. This is the Fig. 2 position.

In order to cushion this action an oil trap is provided. As the circumferential rib 41 moves into the recess 43, the oil is trapped in the space 50. Preferably the trapping action does not become effective until there is a dental engagement of the teeth. Further movement of the member 37 on the helical splines, therefore, is controlled by the trapped oil, and in fact, there is a dash pot action. The small grooves 42 in the member 41 provide for escape of the oil and as it escapes, the member 37 closes in against the collar 40, ultimately coming to the Fig. 2 position.

Now let it be assumed that the driven shaft 35 tends to overrun the driving shaft 30. The driven part 37 is caused to rotate uniformly with the driving shaft so long as there is a dental engagement; faster rotation of the driven shaft causes the driven member 37 to be retracted on the helical splines until the teeth disengage. Thereupon there is a free overrunning action. At this time the teeth 39 are rotating in a direction which corresponds to an up direction with respect to the teeth 33 as Fig. 4 is viewed, and it will be noted how the inclined teeth facilitate the free wheeling action, and particularly at the start thereof, since the inclined teeth may further aid in shifting the driven member 37 to the left.

A modified form shown in Fig. 11 may here be discussed. It comprises the same parts heretofore described, with the addition of a light coil spring 51 acting upon the member 37, normally urging it to the right. Even though this spring urges the member 37 to the right, thus tending to engage the teeth, the teeth will not engage while overrunning due to their formation, but their inclined surfaces will ride along each other with very little, if any, noticeable noise. This spring aids the action of returning the parts to the Fig. 2 position when the driving shaft again starts to rotate faster than the driven shaft, in that even though there be some slippage and even a failure of the drag action of the lubricant, the spring 51 is effective for shifting the member 37 to the right until there is a dental engagement.

Thus it will be observed that the unit provides for a free wheeling action without the use of a one-way coupling such as balls and inclines or such as a coil spring clutch type of device. The fork and bearing which are effective upon the driven member 37 are subject to control and as a result certain controlled actions may be obtained in the function of this overrunning device, and at this time the description will continue relative to the mechanism for such control.

Journaled in the portion of the housing around the rod 48 is a stub shaft 55 connected to which is a cam 56 (Figs. 5 and 6). This cam acts upon an abutment 57, which is part of the fork 47. This cam as shown has two rather well defined faces, one of which at 58 is on a long radius and the other of which at 59 is on a short radius. The cam is shown in its two extreme positions in Figs. 5 and 6. Outside the housing an arm 60 is secured to the shaft. This arm may advantageously have an enlarged center portion provided with notches as at 61 and 62. This arm has its end pivotally connected to a block 63 slidable upon the rod 24 and located between two coil springs. One spring 65 lies between the block and a head 66 on the end of the rod, while the other spring 67 lies between the block and a head or washer 68 fixed to the shaft 24. As heretofore pointed out, the rod 24 is connected to the clutch throwout lever.

A locking arm 70 may be pivoted to the housing as at 71 and it may have two locking projections or detents 72 and 73. This locking arm is arranged to be controlled by the operator of the vehicle and to this end a Bowden wire 75 may be connected to the arm as at 76 and it may extend to a convenient location inside the vehicle, as, for example, to the instrument panel, where it may be provided wih a button or operating piece 77.

The operation of the device including the control for the free wheeling unit may now be related. Normally, when the clutch lever is in its retracted position, as shown in Figs. 1 and 7, the springs 65 and 67 position the arm 60, as shown in Figs. 1, 7, and 9. The cam 56 is positioned so that its face on the long radius is effective on the fork, as illustrated in Fig. 6. Thus the fork is urged forwardly or to the right, as Figs. 2 and 3 are viewed, compressing spring 49, and the fork holds the driven member 37 of the free wheeling unit in engaged position, as shown in Fig. 2.

Now, if the particular driver of the vehicle does not wish to have the free wheeling action and desires to operate the clutch in the usual manner by depressing the lever 20 each time it has to be disengaged for gear shift or the like, the button 77 is moved to the full line position shown in Fig. 7. This rocks the locking arm 70 so that its detent 73 locks into the recess 62. Now when the clutch lever is depressed the spring 67 is flexed to permit movement of the rod 24 but the free wheeling unit remains locked in its driving condition. Suppose now that the operator desires to have a free wheeling action in the normal driving of the car; the button 77 may be actuated to release the locking arm, then the clutch lever may be depressed. This rocks the cam element and brings its cam face into contact with the abutment 57. The pressure exerted on the cam face by the abutment rocks the cam element further to the Fig. 5 position, bringing its face on the short radius into position, as shown in Fig. 5. The spring 49 may now urge the fork to the left as Fig. 3 is viewed, and the Bowden wire is now actuated by moving the button 77 to the dotted line position A. This rocks the locking arm 70 and the control parts take the position as shown in Fig. 8, with the detent 72 locking in notch 61.

Now when the clutch lever is released and allowed to retract, which retraction may be partly due to the springs in the clutch and partly due to a conventional retracting spring 80, the spring 65 collapses. Accordingly the fork is held ineffective by the spring 49 and the free wheeling unit establishes a driving connection from the driving shaft to the driven shaft when the R. P. M. of the driving shaft exceeds that of the driven shaft, and this connection is broken to result in the free wheeling action when the R. P. M. of the driving shaft falls below that of the driven shaft. This action has been previously described. Also the speed change transmission gears may be changed in the well known manner of merely allowing the engine to decelerate and without requiring clutch actuation.

So it will be seen that two conditions may be maintained, one being a positive drive at all times, requiring actuation of the clutch releasing pedal to change gears, and the other being that of a normal free wheeling action in which the vehicle will overrun the engine and in which the speed change gears may be actuated without operation of the clutch releasing lever.

A third condition may be had which will provide a normally conventional drive for the vehicle in that there is no free wheeling action but in which it is unnecessary for the operator to release the clutch in order to shift gears. This makes it as easy for the operator to shift gears as though there was a free wheeling action, but at the same time satisfies those operators who do not wish to operate their car with a normal free wheeling action. This condition may be obtained by positioning the control button to the place B, thus positioning the locking arm 70, as shown in Fig. 9, where it is ineffective. When the clutch lever is retracted the springs 65 and 67 position the arm 60 as shown in Fig. 9.

Now assume that the vehicle is operating on a roadway and the accelerator is relieved; the driven shaft tends to overrun the driving shaft and this normally would disengage the members 32 and 37 of the free wheeling unit, but the fork is held by the cam 56 so that the member 37 of the free wheeling unit cannot shift to the left as Fig. 2 is viewed. Accordingly the vehicle does not overrun the engine and the member may be used as a decelerating agent.

In order to shift the gears in the transmission the operator has only to depress the lever 20 through a few degrees. This actuation of the lever 20 is sufficient to move the high point of the cam 56 beyond blocking position with respect to the abutment 57. Now when the vehicle starts to overrun the engine the member 37, due to the helical splines, starts to shift away from the member 32 and this action will separate the dental engagement and cause further rocking movement of the cam 56. At this time, of course, the spring 65 is compressed by the power tending to shift member 37, but the spring 65 has a strength amounting only to a few pounds, whereas there is a great force tending to shift the member 37. Then when the clutch lever is released the arm 60 is moved back to the Fig. 9 position and the free wheeling unit again locked out, so that free wheeling is prevented. Since the driving action of the driving shaft tends to move the member 37 into engaged position, no particularly hard work is required to thus shift the cam from the Fig. 5 position to the Fig. 6 position except that the spring 65 is strong enough to overcome the spring 49.

To further exemplify the action wherein there is a normal conventional drive of the vehicle supplemented by a free wheeling action for a gear change, picture a vehicle getting under way from a standing start. When the engine is idling and the vehicle at rest, the centrifugal clutch is open. The operator may shift into low gear and accelerate the engine to get the vehicle under way. The operator may now depress the lever 20 sufficiently to shift the cam from the Fig. 6 position to the Fig. 5 position, and the clutch lever may be held thus slightly depressed during the entire range of shifting gears from low, through second, into high gear, as there is at this time a free wheeling action. As soon as the vehicle is operating in high gear the lever may be released and the cam shifts back to Fig. 6 position so that the free wheeling unit is held engaged and there is no free wheeling action. Accordingly, it will be observed that this arrangement is especially advantageous for use in combination with a centrifugal clutch, as the operator at no time is required to disengage the clutch manually to engage gears in the transmission irrespective of whether or not the vehicle is standing idle or in motion. Furthermore, the arrangement is preferably such that the lever 20 may be moved to thus actuate the cam controlling arm 60 without disengaging the clutch or without partially disengaging the clutch. Accordingly, only a very light pressure is required which may be about the same or less than the weight of the foot of the operator. Ordinarily a clutch lever has a range of ineffective movement generally known as lash movement before encountering the clutch packing springs, and the arrangement may advantageously be such that the control mechanism for the free wheeling unit is actuated in this lash movement of the lever.

It is, of course, within the invention to connect the control for the cam to any suitable actuating element to be actuated by the operator. The clutch lever is such an element although a separate device may be used for this purpose, which may be in the form of a button or the like, located, for example, on the toe boards. This is illustrated in Fig. 12. The separate button 81 is operable to render the free wheeling unit effective through the means of a bell crank 82 connected to the rod 24. In this form the free wheeling action may be locked out or locked in and the button 81 may be depressed to effect gear shifting when a free wheeling action is normally not desired. The rod 24, as shown in Fig. 1, is disposed at quite an angle to the horizontal; this happens to be due to the particular relative location of the fulcrum for the clutch lever and the coupling control arm. However, some clutch levers are pivoted at a place higher relative to the clutch housing and the rod may assume a more nearly horizontal position as illustrated in some of the other views such as Figs. 7 and 8 to 10. Accordingly, this matter depends upon the general design of the several parts and is within the realm of a mechanic to modify.

I claim:

1. A coupling comprising in combination with a driving shaft and a driven shaft, a toothed member keyed to the driving shaft, helical splines on the driven shaft, a toothed member fastened to the driven shaft by the helical splines, cooperating surfaces on the said members arranged to effect a frictional drag action, said second member being shiftable axially due to the helical splines in a direction depending upon the direction of applied torque whereby the members come together for dental engagement with the torque from driving member to driven member and separate to break the dental engagement with torque from the driven member to the driving member, a stop for limiting the movement of the second mentioned member toward the first mentioned member, a recess in the second mentioned member, a circumferential rib on the stop for entering the recess and for trapping oil therein as the second mentioned member shifts toward the first mentioned member, grooves in the rib for allowing escape of the oil to effect a dash pot controlling action, and operator controlled holding means for holding the second member against axial shift and in clutching engagement with the first member.

2. A coupling comprising in combination with a driving shaft and a driven shaft, a member keyed to one shaft having teeth the ends of which are inclined, helical splines on the other shaft, a member mounted on the other shaft and on the helical splines arranged to shift axially on the shaft in a direction depending upon the direction of applied torque, said second member having teeth for dental engagement with the teeth on the first member, and said teeth on the second member being inclined similarly to the inclination of the teeth on the first member for facilitating dental engagement as the second member moves toward the first, the teeth on both members having sides substantially in radial planes whereby the teeth are adapted to transmit torque in either direction, spring means urging the second member toward the first member, and cooperating friction creating surfaces between the two members arranged to impart rotary movement to the second mentioned member upon rotation of the first mentioned member and when the two members are out of dental engagement.

3. A coupling comprising in combination with a driving shaft and a driven shaft, a clutching member keyed to the driving shaft, helical splines on the driven shaft, a clutching member mounted on the helical splines of the driven shaft, cooperating friction creating surfaces between the two clutching members, said second member being shiftable axially by the helical splines in a direction depending upon the direction of applied torque whereby the members come together for clutching engagement when the torque is in one direction and separate to break the clutching engagement when the torque reverses, spring means urging the second member toward the first member, and means for holding the axially shiftable member against axially shifting and in clutching engagement with the first mentioned member.

4. A coupling comprising in combination with a driving shaft and a driven shaft, a clutching member keyed to the driving shaft, helical splines on the driven shaft, a clutching member mounted on the helical splines of the driven shaft, cooperating friction creating surfaces between the two clutching members, said second member being shiftable axially by the helical splines in a direction depending upon the direction of applied torque whereby the members come together for clutching engagement when the torque is in one direction and separate to break the clutching engagement when the torque reverses, thrust means for holding the second mentioned member in clutching engagement with the first mentioned member and preventing axial shift of the second mentioned member upon torque reversal, and a controlling cam element acting upon the thrust means and movable to hold the thrust means effective and to render the thrust means ineffective.

5. A coupling comprising in combination with a driving shaft and a driven shaft, a clutch member keyed to the driving shaft, helical splines on the driven shaft, a clutch member mounted upon the helical splines, cooperating closely fitting friction creating surfaces directly on the two clutching members, said helical splines serving to shift the clutching member on the driven shaft axially to and from clutching engagement with the member on the driving shaft in accordance with the direction of applied torque, and a relatively light spring acting upon the clutching member on the driven shaft for continuously urging the same toward the clutching member on the driving shaft.

6. In an automotive vehicle, the combination of a clutch, a transmission having speed change gears, a driving shaft, all of the above mentioned elements being arranged to transmit driving action one to the other, a driven shaft, a coupling between the driving shaft and the driven shaft of the type for transmitting driving action from the driving shaft to the driven shaft and to allow the driven shaft to overrun the driving shaft, a clutch releasing lever having a range of movement in which it is ineffective upon the clutch, shiftable means acting upon the coupling and normally holding the coupling conditioned so that the driven shaft and the driving shaft are positively connected and the driven shaft may transmit driving action to the driving shaft, and means interconnecting the clutch lever and the shiftable means whereby movement of the clutch lever may shift said means and render the same ineffective so that the driven shaft may overrun the driving shaft for facilitating shift of gears in the transmission without clutch release.

7. In an automotive vehicle, a clutch, a release lever therefor, a transmission having speed change gears, a driven shaft, a free wheeling coupling between the transmission and the driven shaft, a shiftable control member for the coupling, means interconnecting the control member and clutch lever whereby the clutch lever may move the control member including springs collapsible to permit lever movement independently of movement of the control member, means for locking the control member to condition the coupling for free wheeling and for conditioning the coupling for positive driving action as elected, said locking means being shiftable to a neutral or ineffective position, and the said interconnection with the clutch lever arranged to position the control member to condition the coupling for positive drive action when the clutch lever is retracted and to shift the control member to condition the coupling for free wheeling action upon movement of the clutch lever.

8. In an automotive vehicle, a free wheeling coupling, a control element therefor shiftable to condition the coupling for free wheeling action or for positive connection, locking means operable at will to lock the control element in free wheeling position and in positive position and movable to position in which the locking means is ineffective upon the control element, a clutch lever, and means interconnecting the clutch lever with the coupling control element whereby movement of the clutch lever may condition the free wheeling coupling and including springs which permit lever movement independently of the controlling element when the same is held by the locking device.

9. In an automotive vehicle the combination of a centrifugal clutch, a free wheeling coupling, means for locking the coupling in free wheeling condition and in positive drive condition as elected, said means being shiftable to a position where it is ineffective upon the coupling, a clutch releasing lever arranged to have a lash movement in which it is ineffective for clutch release, means interconnecting the clutch lever and the free wheeling coupling arranged to hold the coupling normally in positive driving condition and effective to condition the coupling for free wheeling action to facilitate change of gears without clutch release, said interconnecting means including springs for permitting lever movement when the said locking means is effective upon the free wheeling coupling.

ERNEST E. WEMP.